United States Patent
Yu et al.

(10) Patent No.: US 9,356,476 B2
(45) Date of Patent: May 31, 2016

(54) ELECTRONIC DEVICE AND POWER SUPPLYING METHOD AND WIRELESS POWER SUPPLYING SYSTEM THEREOF

(75) Inventors: Zida Yu, Shandong (CN); Bing Bai, Shandong (CN); Ronghong Chi, Shandong (CN); Jinliang Li, Shandong (CN)

(73) Assignees: Haier Group Corporation, Shandong (CN); Qing Dao Haier Electronics Co., Ltd., Shandong (CN)

( * ) Notice: Subject to any disclaimer, the term of this patent is extended or adjusted under 35 U.S.C. 154(b) by 749 days.

(21) Appl. No.: 13/701,171

(22) PCT Filed: Dec. 23, 2010

(86) PCT No.: PCT/CN2010/080161
§ 371 (c)(1),
(2), (4) Date: Nov. 30, 2012

(87) PCT Pub. No.: WO2011/160405
PCT Pub. Date: Dec. 29, 2011

(65) Prior Publication Data
US 2013/0076155 A1 Mar. 28, 2013

(30) Foreign Application Priority Data
Jun. 24, 2010 (CN) .......................... 2010 1 0208341

(51) Int. Cl.
*H01F 38/00* (2006.01)
*H02J 17/00* (2006.01)
*H02J 9/06* (2006.01)

(52) U.S. Cl.
CPC ........ *H02J 17/00* (2013.01); *H02J 9/061* (2013.01)

(58) Field of Classification Search
CPC .................................. H02J 17/00; H02J 9/061
See application file for complete search history.

(56) References Cited

U.S. PATENT DOCUMENTS

| 8,656,193 B2 * | 2/2014 | Hijazi | G06F 1/263 |
| | | | 713/300 |
| 2005/0002213 A1 * | 1/2005 | Komori et al. | 363/56.01 |
| 2011/0050164 A1 * | 3/2011 | Partovi et al. | 320/108 |

FOREIGN PATENT DOCUMENTS

| CN | 2503524 Y | 7/2002 |
| CN | 1710604 A | 12/2005 |

(Continued)

OTHER PUBLICATIONS

International Preliminary Examination Report issued in PCT/CN2010/080161, transmitted Mar. 4, 2011, 6 pages, in English translation.

*Primary Examiner* — Thienvu Tran
*Assistant Examiner* — Tien Mai
(74) *Attorney, Agent, or Firm* — Faegre Baker Daniels LLP (57) ABSTRACT

An electronic device, and a power supplying method and a wireless power supplying system thereof. The electronic device includes a wired electric power receiving module, a wireless electric power receiving module and a switch. The wired electric power receiving module is connected to an external power supply by wired transmission. The wireless electric power receiving module receives the wireless electric power from an external wireless electric power transmitting device. The switch is coupled to the wired electric power receiving module and the wireless electric power receiving module and is used to switch between the wired electric power receiving module and the wireless electric power receiving module, to supply the operating voltage. The electronic device can operate in the wireless power supplying mode or the wired power supplying mode, so as to facilitate a user to use.

19 Claims, 4 Drawing Sheets

(56) References Cited

FOREIGN PATENT DOCUMENTS

| CN | 201374586 Y | 12/2009 |
| CN | 101667754 A | 3/2010 |
| CN | 201430652 Y | 3/2010 |

* cited by examiner

ELECTRONIC DEVICE AND POWER SUPPLYING METHOD AND WIRELESS POWER SUPPLYING SYSTEM THEREOF

CROSS-REFERENCE TO RELATED APPLICATION

The present application is a national phase application of PCT application PCT/CN2010/080161 filed pursuant to 35 U.S.C. §371, which claims priority to Chinese Application CN 201010208341, filed Jun. 24, 2010. Both applications are incorporated herein by reference in their entirety.

TECHNICAL FIELD

The present invention relates to a wireless power supplying technology, and in particular, to an electronic device adopting the wireless power supplying, a power supplying method thereof and a wireless power supplying system suitable for the electronic device.

BACKGROUND OF THE INVENTION

The household electronic devices such as a television obtain the electric power from a power supply, which is generally implemented via a direct contact between conductors. Therefore, to provide the electronic device with the power supply such as an Alternating Current (AC) power supply, a power line is required for connecting to the power supply. However, the position of the household electronic device such as a television is limited due to the limitation by the power line, which brings great inconvenience to users.

So far, a wireless power supplying technology, in which the electric power transmission is performed by the magnetic coupling resonance, has been proposed. Such a technology uses the radiationless magnetic coupling, that is, two resonant objects with the same frequency generate a strong mutual coupling and form a resonant circuit by using a single-layer coil, without emitting the electromagnetic wave, so that the waste of the energy is reduced. When a coil provided with an antenna formed of five turns of thick copper wire is used, the efficiency is about 40% for 2-meter transmission, and up to about 90% for 1-meter distance, which would establish a widely applicable wireless power supplying technology.

Therefore, if such a wireless power supplying technology is applied to various kinds of electronic devices, for example, the household electronic device such as a television, the user will be provided with great convenience, and the purposes of efficient power supplying and a low electromagnetic interference can be achieved.

SUMMARY OF THE INVENTION

The purpose of the present invention is to provide an electronic device which may operably switch between a wireless power supplying mode and a wired power supplying mode to facilitate the usage by a user.

Another purpose of the present invention is to provide a wireless power supplying system, which is suitable for the electronic device that can switch between a wireless power supplying mode and a wired power supplying mode.

Another purpose of the present invention is to provide a power supplying method of an electronic device, which enables the electronic device to be operated in a wired power supplying mode or a wireless power supplying mode selectively.

The purpose of the present invention and the resolving of the technical problem are implemented by the technical solutions as follows.

An aspect of the present invention proposes an electronic device including a wired electric power receiving module, a wireless electric power receiving module and a switch. The wired electric power receiving module is connected to an external power supply in a wired manner and is adapted to provide an operating voltage of the electronic device; the wireless electric power receiving module provides the operating voltage of the electric device by receiving wireless electric power transmitted from an external wireless electric power transmitting device; and the switch is electrically coupled to the wired electric power receiving module and the wireless electric power receiving module alternatively, to switch between the wired electric power receiving module and the wireless electric power receiving module, to provide the operating voltage.

In one aspect of the present invention, the switch is switched to enable the wired electric power receiving module to provide the electronic device with the operating voltage when a wired connection between the wired electric power receiving module and the external power supply is established, and enable the wireless electric power receiving module to provide the electronic device with the operating voltage when the wired connection between the wired electric power receiving module and the external power supply is not established.

In one aspect of the present invention, the switch includes a normally open contact and a normally closed contact, where the normally closed contact is electrically coupled to the wireless electric power receiving module and the normally open contact is electrically coupled to the wired electric power receiving module. Herein, the switch is, for example, a relay, but the present invention is not limited thereto.

In one aspect of the present invention, the wired electric power receiving module includes an AC input terminal and a power line; the AC input terminal is electrically coupled to the switch, and the power line is used to establish the wired connection between the AC input terminal and the external power supply. Herein, the power line is provided in the electronic device in a pluggable manner or in an unpluggable manner.

In one aspect of the present invention, the wireless electric power receiving module includes a wireless electric power receiving and transforming unit, a detection control unit and a wireless signal transceiver unit; where the wireless electric power receiving and transforming unit is electrically coupled to the switch, and is adapted to receive the wireless electric power, and adjust electrical parameters of the received wireless electric power to output the operating voltage to the switch; the detection control unit detects whether the wired connection between the wired electric power receiving module and the external power supply is established; and the wireless signal transceiver unit is controlled by the detection control unit, and is adapted to transmit to the external wireless electric power transmitting device a request for stopping the wireless electric power transmission, when the detection control unit detects that the wired connection between the wired electric power receiving module and the external power supply has been established.

In one aspect of the present invention, a resonant magnetic coupling is established between the wireless electric power receiving module establishes and the external wireless electric power transmitting device to receive the wireless electric power.

In one aspect of the present invention, the electric device further includes a state display system which is electrically connected to the switch and the internal function circuit of the electronic device, and is adapted to display a current power supplying state of the electronic device when the electronic device is operating in a wired power supplying mode or a wireless power supplying mode.

In one aspect of the present invention, the state display system includes a state detection module, a micro controller unit, a data storage module, a data processing module and a display module, where the state detection module, the data storage module, the data processing module and the display module are electrically connected to the micro controller unit, and the data processing module is electrically connected to the data storage module and the display module, respectively.

In one aspect of the present invention, one end of the state detection module is electrically connected to the switch, and the other end thereof is electrically connected to the micro controller unit; the state detection module receives a switch state signal from the switch, and transmits the switch state signal to the micro controller unit; and the micro controller unit processes the switch state signal and then outputs a control signal to the data processing module.

In one aspect of the present invention, the data storage module is electrically connected to the micro controller unit to store the preset state information.

In one aspect of the present invention, the data processing module is electrically connected to the micro controller unit, the data processing module and the display module, respectively, and is adapted to receive the control signal output from the micro controller unit, and read the matched state information from the data storage module.

In one aspect of the present invention, the display module is connected to the micro controller unit and the data processing module, respectively, to display the state information transmitted from the data processing module.

Another aspect of the present invention proposes a wireless power supplying system suitable for an electronic device having a wireless power supplying mode and a wired power supplying mode that are switchable. In the present embodiment, the wireless power supplying system includes a wireless electric power transmitting device and a wireless electric power receiving device separated from the wireless electric power transmitting device. The wireless electric power receiving device mat include a wireless electric power receiving and transforming unit, a detection control unit and a wireless signal transceiver unit; the wireless electric power receiving and transforming unit receives a high frequency AC signal from the wireless electric power transmitting device, for example, by means of magnetic coupling resonance, and adjusts electrical parameters of the high frequency AC signal to provide an operating voltage which the electronic device requires when operating in the wireless power supplying mode; the detection control unit detects whether the electric device operates in a wired power supplying mode; and the wireless signal transceiver unit is controlled by the detection control unit, and is adapted to transmit to the wireless electric power transmitting device a request for stopping wireless electric power transmission when it is detected that the electronic device operates in the wired power supplying mode, to inform the wireless electric power transmitting device of stopping transmitting the wireless electric power to the wireless electric power receiving and transforming unit.

In one aspect of the present invention, the wireless electric power transmitting device including a main controller, a wireless electric power generating and transmitting unit and a second wireless signal transceiver unit; the wireless electric power generating and transmitting unit is controlled by the main controller to generates a high frequency AC signal according to a DC voltage, and transmits the high frequency AC signal to the wireless electric power receiving and transforming unit in a wireless manner; and the second wireless signal transceiver unit is electrically connected to the main controller, receives the request for stopping the wireless electric power transmission, and transmits the request to the main controller.

In one aspect of the present invention, the wireless power supplying system further includes a power supplying device, which provides a DC voltage and the operating voltages of the main controller and the wireless electric power transmitting unit according to an AC input voltage.

Another aspect of the present invention proposes a power supplying method of an electronic device, which is suitable for the electronic device having a wireless power supplying module and a wired power supplying module that are switchable and includes: presetting the electronic device to receive a power supply voltage from a wireless power supplying module; and switching off the wireless power supplying module when the electronic device starts to receive the power supply voltage from the wired power supplying module.

In one aspect of the present invention, before switching off the wireless power supplying module when the electronic device starts to receive the power supply voltage from the wired power supplying module, the power supplying method further includes: detecting whether the electronic device starts to receive the power supply voltage from the wired power supplying module.

In one aspect of the present invention, after detecting whether the electronic device starts to receive the power supply voltage from the wired power supplying module, the power supplying method further including: transmitting a result of the detection outwards from the electronic device in a wireless manner after detecting that the electronic device has started to receive the power supply voltage from the wired power supplying module.

The present invention provides the electronic device with the wireless electric power receiving module (the wireless electric power receiving device) suitable for receiving the wireless electric power, and provides the switch adapted to switch the electronic device between the wireless power supplying mode and the wired power supplying mode, and therefore, the user can flexibly choose the power supplying mode of the electronic device, so that the use convenience is improved greatly. Further, the detection control unit is provided in the wireless electric power receiving module to detect whether the electronic device operates in the wired power supplying mode and inform the external wireless electric power transmitting device of the detection result via the wireless signal transceiver unit, thus when the electronic device operates in the wired power supplying mode, the external wireless electric power transmitting device is stopped from transmitting the wireless electric power for the purpose of protecting the external wireless electric power transmitting device and/or saving the energy consumed. In addition, the state display system is further provided for displaying the current power supplying state of the electronic device, which is either the wired power supplying state or the wireless power supplying state, which allows the user to know the power supplying state of the electronic device intuitively and conveniently to improve the convenience and applicability.

Above description is only general description of the inventive solutions. Embodiments are described as follows in conjunction with the drawings, in order for better understanding of the technical means of the present invention, carrying out the present invention according to the content of the description, and clearly understanding of the above and other purposes, features and advantages.

DETAILED DESCRIPTION

In order to further describe the technical means adopted by the present invention to achieve the predetermined purpose and effects thereof, specific embodiments, structures, features and effects of the electronic device and the wireless power supplying system proposed according to the present invention are described as follows in detail, in conjunction with drawings and the preferred embodiments.

Figure 1:
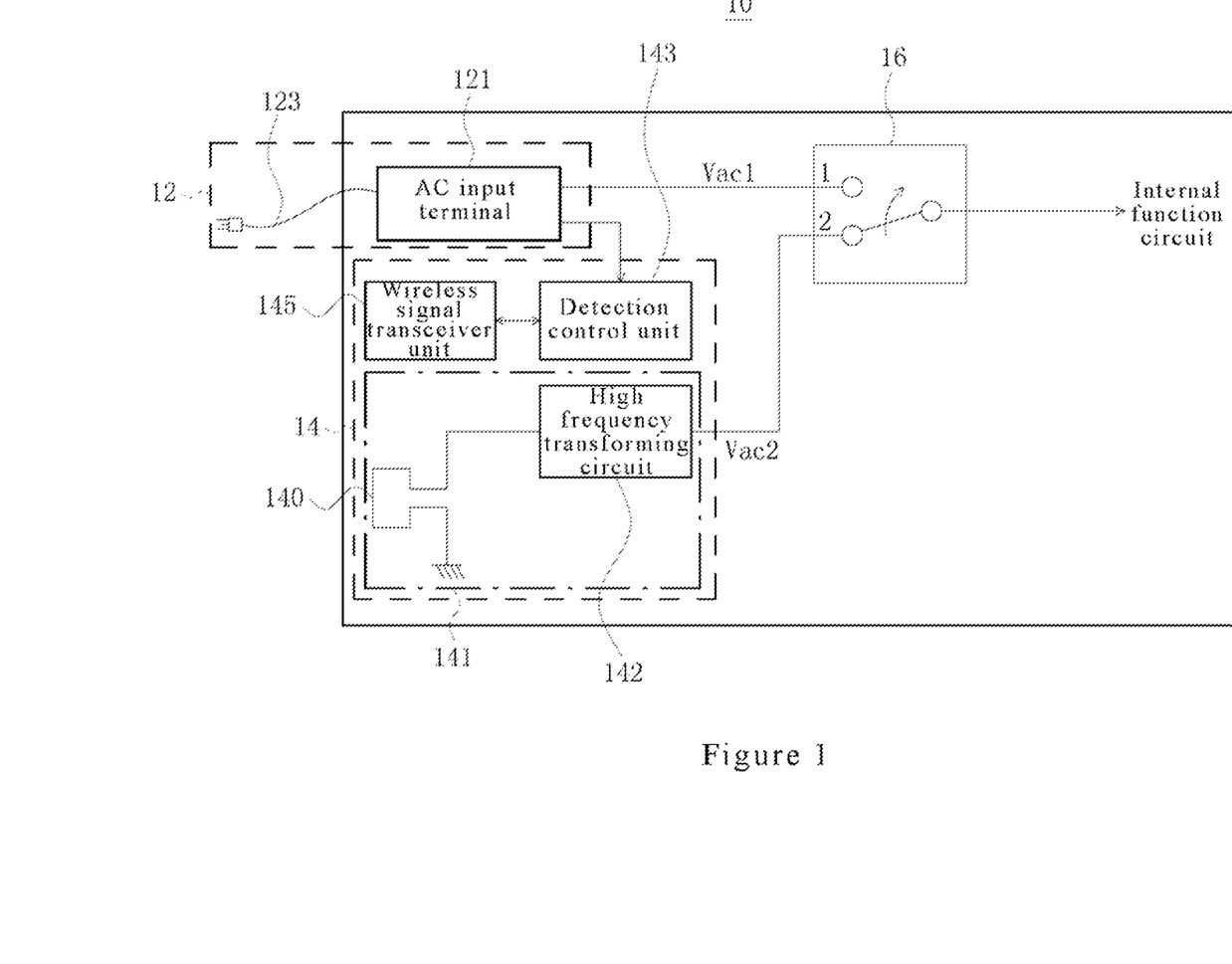
FIG. 1 is a structure block diagram of an electronic device according to an embodiment of the present invention.

Reference is now made to FIG. 1 which shows a structure block diagram of an electronic device according to an embodiment of the present invention. As shown in FIG. 1, an electronic device 10 includes a wired electric power receiving module 12, a wireless electric power receiving module 14 and a switch 16. The wired electric power receiving module 12 is electrically connected to the wireless electric power receiving module 14, and both the wired electric power receiving module 12 and the wireless electric power receiving module 14 are electrically connected to the switch 16 which is connected to an internal function circuit (for example, an audio and video processing circuit and so on) of the electronic device 10. In the present embodiment, a relay is used as the switch 16 for illustration, and the switch 16 includes a normally open contact 1 and a normally closed contact 2. In addition, the electronic device 10 in the present embodiment is, for example, a household appliance such as a television, which is not intended to limit the present invention.

The wired electric power receiving module 12 includes an AC input terminal 121 and a power line 123; the AC input terminal 121 is electrically coupled to the normally open contact 1 of the switch 16, the power line 123 is used to establish a wired connection between the AC input terminal 121 and an external power supply (not shown in FIG. 1) such as an AC power supply, to provide an operating voltage required by the electronic device 10 for operating in a wired power supplying mode. Herein, the power line 123 is provided in the electronic device 10 in a pluggable manner or in an unpluggable manner.

The wireless electric power receiving module 14 includes a wireless electric power receiving and transforming unit 141, a detection control unit 143 and a wireless signal transceiver unit 145. The wireless electric power receiving and transforming unit 141 includes a receiving coil 140 and a high frequency transforming circuit 142, with one end of the receiving coil 140 being grounded and the other end thereof being electrically connected to the high frequency transforming circuit 142, so that the receiving coil 140 may receive wireless electric power from an external wireless electric power transmitting device (not shown in FIG. 1) in a magnetic coupling resonance manner; the high frequency transforming circuit 142 is electrically connected to the normally closed contact 2 of the switch 16 to adjust electrical parameters (such as the frequency and the amplitude) of the wireless electric power received by the receiving coil 140 to output an operating voltage required by the electronic device 10 when operating in a wireless power supplying mode. The detection control unit 143 is electrically connected to the AC input terminal 121 of the wired electric power receiving module 12 to detect whether the wired connection between the wired electric power receiving module 12 and the external power supply has been established, that is, whether the electronic device 10 operates in a wired power supplying mode, and generates a control signal according to the detection result. The wireless signal transceiver unit 145 is electrically connected to the detection control unit 143 to be controlled by the detection control unit 143, and transmits to the external wireless electric power transmitting device a request for stopping the wireless electric power transmission, when the detection control unit 143 detects that the wired connection between the wired electric power receiving module 12 and the external power supply has been established, to allow the external wireless electric power transmitting device to stop transmitting the wireless electric power to the wireless electric power receiving module 14. Herein, the wireless signal transceiver unit 145 is, for example, an infrared signal transceiver unit, a Bluetooth transceiver unit, a radio frequency transceiver unit, and so on, but the present invention is not limited thereto.

The switching between a wireless power supplying mode and a wired power supplying mode in the electronic device 10 as proposed in the embodiment of the present invention is specifically described in conjunction with FIG. 1.

Since the wireless electric power receiving module 14 is connected to the normally closed contact 2 of the switch 16, the electronic device 10 in a normal state (i.e., a preset state) is provided with the operating voltage by the wireless electric power receiving module 14. That is, the electronic device 10 operates in the wireless power supply mode in the normal state. Specifically, in the wireless power supplying mode, the receiving coil 140 of the wireless electric power receiving module 14 receives and transmits the wireless electric power to the high frequency transforming circuit 142 for the adjustment of electrical parameters (such as a frequency and an amplitude) of the wireless electric power, and then the high frequency transforming circuit 142 outputs an AC voltage Vac2, which is supplied to the internal function circuit of the electronic device 10 via the switch 16 as the operating voltage.

When the user connects the power line 123 to a power socket (not shown in FIG. 1), the AC input terminal 121 transmits the AC voltage Vac1 (such as the utility power supply voltage 220V) from the power socket to the normally open contact 1 of the switch 16, so that the switch 16 is switched (to connect the normally open contact 1, in an attracted state) to supply the AC voltage Vac1 to the internal function circuit of the electronic device 10 as the operating voltage, and at the same time, the wireless electric power receiving module 14 stops supplying power to the internal function circuit of the electronic device 10. The detection control unit 143 detects that the wired connection between the wired electric power receiving module 12 and the external power supply has been established, that is, the electronic device 10 operates in a wired power supplying mode, and instructs the wireless signal transceiver unit 145 to transmit, to the external wireless electric power transmitting device, a request for stopping the wireless electric power transmission, to cause the wireless electric power transmitting device to stop transmitting the wireless electric power to the wireless electric power receiving module 14, thus saving the energy consumed considerably.

Thereafter, if the user pulls the power line 123 out of the power socket, the switch 16 will be switched to a non-attracted state (i.e. the normally closed contact 2 is connected), and the wired electric power receiving module 12 stops supplying power to the internal function circuit of the electronic device 10. In this case, a small amount of electric energy stored in the internal function circuit of the electronic device 10 is used as a buffering power supply, which supplies power temporally to the internal function circuit during a certain period after the power line 123 is pulled out of the power socket. With the buffering power supply, the detection control unit 143 detects that the wired connection between the wired electric power receiving module 12 and the external power supply is not established, and instructs the wireless signal transceiver unit 145 to transmit, to the external wireless electric power transmitting device, a request for starting the wireless electric power transmission, to cause the external wireless electric power transmitting device to transmit the wireless electric power to the wireless electric power receiving module 14, that is, the electronic device 10 is switched to the wireless power supplying mode.

Figure 2:
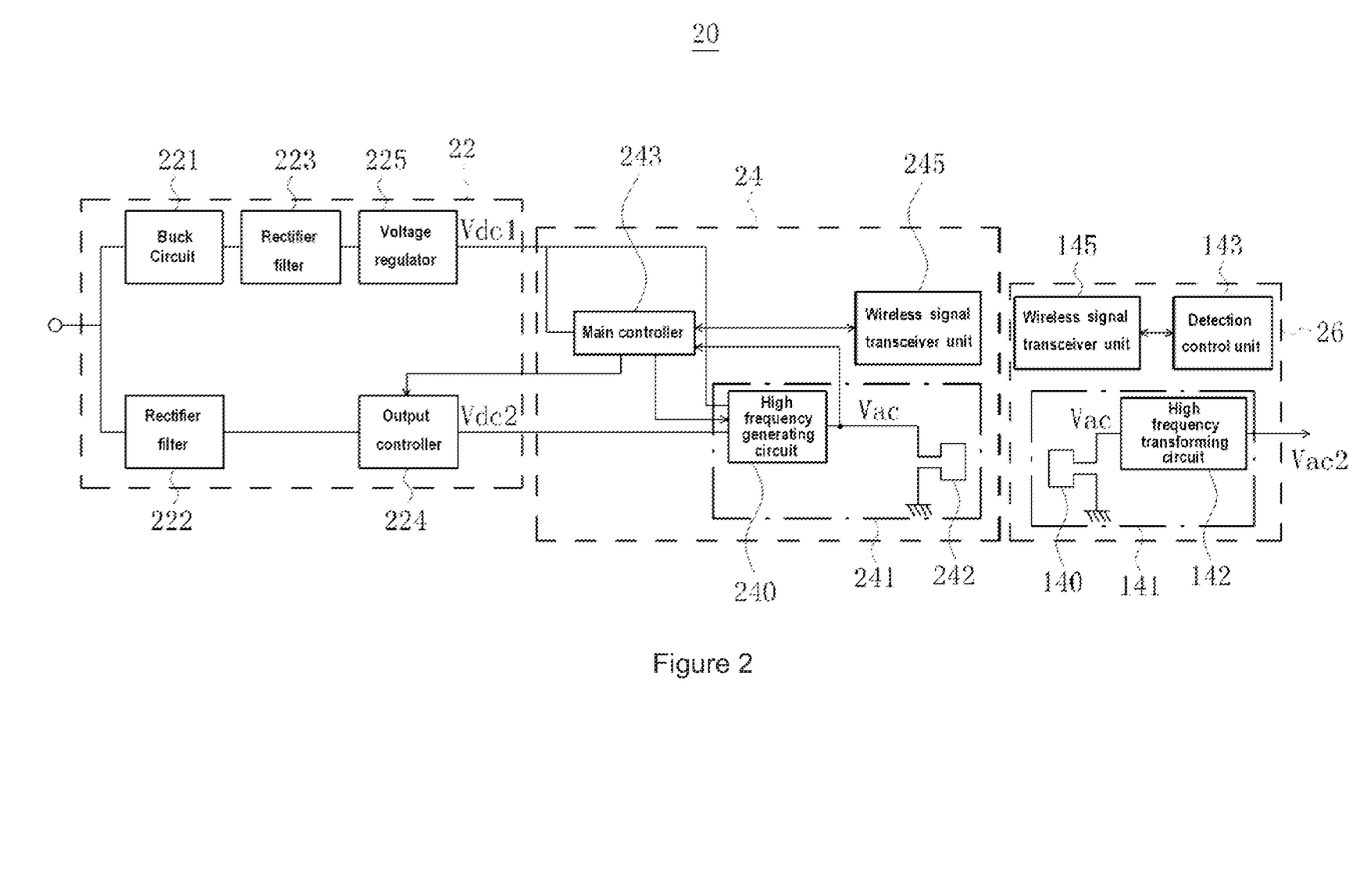
FIG. 2 is a structure block diagram of a wireless power supplying system according to an embodiment of the present invention.

Reference is now made to FIG. 2 which shows a structure block diagram of a wireless power supplying system according to an embodiment of the present invention. As shown in FIG. 2, the wireless power supplying system 20 is suitable for the electronic device 10 having the wireless power supplying mode and the wired power supplying mode that are switchable, as shown in FIG. 1. In the present embodiment, the wireless power supplying system 20 includes a power supplying device 22, a wireless electric power transmitting device 24 and a wireless electric power receiving device 26 separated from the wireless electric power transmitting device 24; herein, when being applied to the electronic device 10, the wireless electric power receiving device 26 can be used as the wireless electric power receiving module 14. In addition, since the circuit structure of the wireless electric power receiving module 14 is described as above, the description of the circuit structure of the wireless electric power receiving device 26 will be omitted.

The power supplying device 22 is adapted to provide a DC voltage Vdc1 (for example, 5-12V) and a DC voltage Vdc2 (for example, above 200V) based on the AC input voltage (for example, the utility power supply voltage 220V). Specifically, the power supplying device 22 includes a first power supplying path consisting of a buck circuit 221, a rectifier filter 223 and a voltage regulator 225 electrically connected in succession, and a second power supplying path consisting of a rectifier filter 222 and an output controller 224 electrically connected; the first power supplying path provides the DC voltage Vdc1 and the second power supplying path provides the DC voltage Vdc2. Herein, the output controller 224 can consist of an electronic switching circuit and adjust the magnitude of the output voltage Vdc2 of the output controller 224 by adjusting the switching duty ratio of the electronic switching circuit.

The wireless electric power transmitting device 24 includes a wireless electric power generating and transmitting unit 241, a main controller 243 and a wireless signal transceiver unit 245; wherein, the wireless electric power generating and transmitting unit 241 includes a high frequency generating circuit 240 and a transmitting coil 242. The high frequency generating circuit 240 is electrically connected to both an output terminal of the first power supplying path and that of the second power supplying path. In the present embodiment, the high frequency generating circuit 240 is electrically connected to the voltage regulator 225 of the first power supplying path and the output controller 224 of the second power supplying path, receives the DC voltage Vcd1 as an operating voltage thereof, generates a high frequency AC signal Vac according to the DC voltage Vdc2, and transmits high frequency AC signal Vac via the transmitting coil 242. Herein, the high frequency generating circuit 240 mainly includes function circuits having an oscillator, an exciter circuit, a power output circuit and so on. The main controller 243 is electronically connected to both the output terminal of the first power supplying path and that of the second power supplying path, and in the present embodiment, the main controller 243 is electrically connected to the voltage regulator 225 of the first power supplying path and the output controller 224 of the second power supplying path, as well as the high frequency generating circuit 240. The main controller 243 receives the DC voltage Vdc1 as the operating voltage thereof, and adjusts the output voltage Vdc2 of the output controller 224 and the output Vac of the high frequency generating circuit 242 by the obtained electrical parameters of the high frequency AC signal Vac output from the high frequency generating circuit 242, so that the high frequency AC output Vac meets the requirements. The wireless signal transceiver unit 245 is electrically connected to the main controller 243, and can be, for example, an infrared transceiver unit, a Bluetooth transceiver unit and so on, which are not intended to limit the present invention; when the wireless signal transceiver unit 245 receives a request for stopping the wireless electric power transmission from the wireless electric power receiving device 26, the maim controller 243 can prevent the wireless electric power transmitting device 24 from transmitting the electric power to the wireless electric power receiving device 26 by stopping the operation of the high frequency generating circuit 240; and when the wireless signal transceiver unit 245 receives the request for starting the electric power transmission from the wireless electric power receiving device 26, the main controller 243 can enable the transmission of the electric power to the wireless electric power receiving device 26 by enabling the high frequency generating circuit 240.

Figure 3:
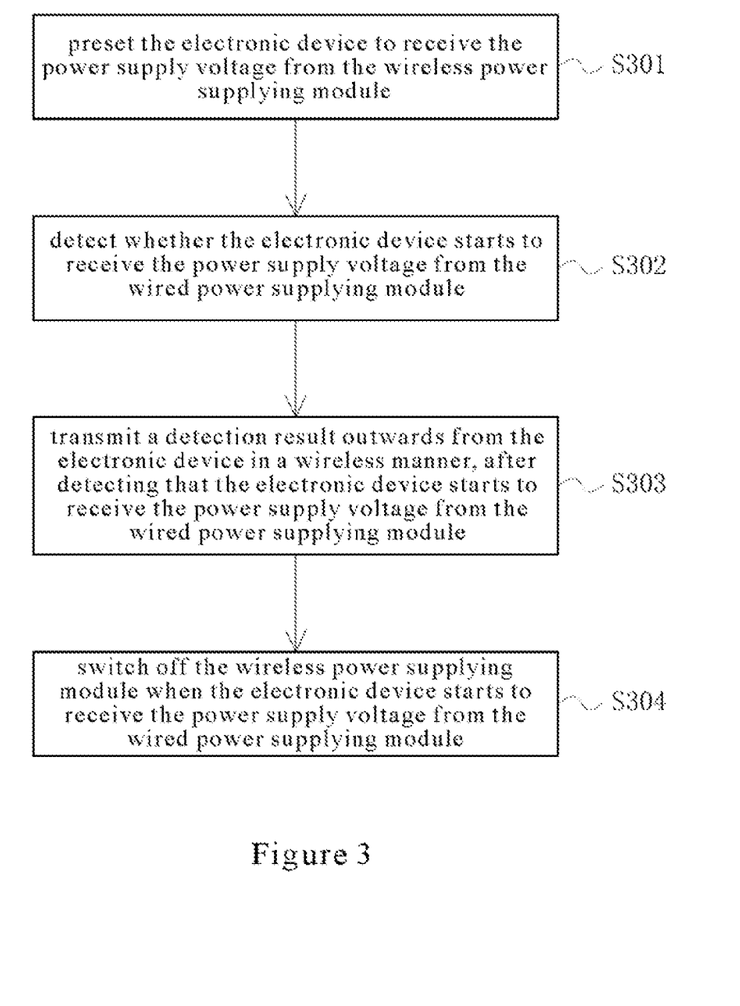
FIG. 3 is a flowchart of a power supplying method according to an embodiment of the present invention.

Reference is now made to FIG. 3. The present invention also provides a power supplying method of the electronic device 10, which is suitable for the electronic device 10 having a wireless power supplying module and a wired power supplying module that are switchable, and includes steps S301 to S304. At step S301, it is assumed that the electronic device 10 operates in the wireless power supplying mode, that is, the electronic device 10 receives the power supply voltage from the wireless power supplying module in the wireless power supplying mode; at step S302, when the electronic device starts to receive the power supply voltage from the wired power supplying module, the wireless power supplying module is switched off, that is, the detection control unit 143 detects whether the electronic device 10 starts to receive the power supply voltage from the wired power supplying module; at step S303, if the power line 123 is connected to the power socket, the AC voltage Vac1 is supplied to an internal function circuit of the electronic device 10 as the operating voltage, and at this time, the detection control unit 143 detects that the electronic device 10 starts to receive the power supply voltage from the wired power supplying module, and transmits a detection result to an external wireless electric power transmitting device of the electronic device 10 wirelessly; at step S304, the detection control unit 143 switches off the wireless electric power receiving module 14 to stop the wireless power supplying to the internal function circuit of the electronic device 10 so that the electronic device 10 operates in the wired power supplying mode, and instructs the wireless signal transceiver unit 145 to transmit, to the external wireless electric power transmitting device, the request for stopping the wireless electric power transmission, so that the wireless electric power transmitting device stops transmitting the wireless electric power to the wireless electric power receiving module 14.

Figure 4:
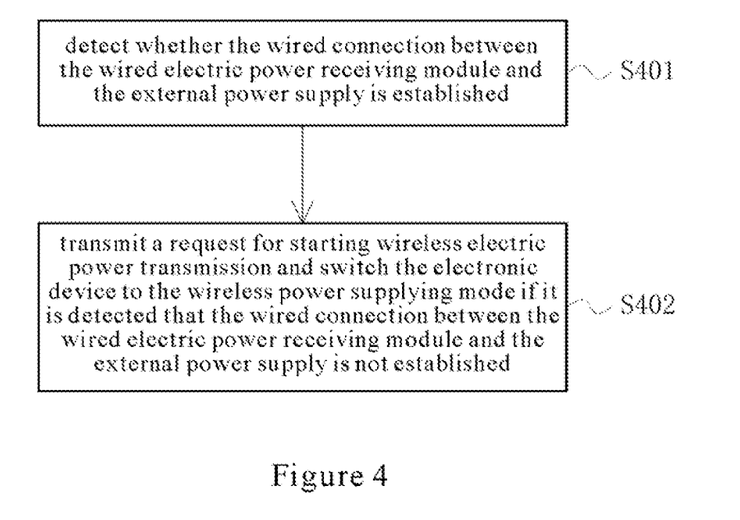
FIG. 4 is a flowchart of a power supplying method according to another embodiment of the present invention.

Reference is now made to FIG. 4, in another embodiment, if the user pulls the power line 123 out of the power socket, the small amount of electric energy stored in the internal function circuit of the electronic device 10 can be used as the buffering power supply which temporally supplies power to the internal function circuit during a certain period after the power line 123 is pulled out of the power socket. With the buffering power supply, the detection control unit 143 detects whether the wired connection between the wired electric power receiving module and the external power supply is established (step S401); if the detection control unit 143 detects that the wired connection between the wired electric power receiving module 12 and the external power supply is not established, the request for starting the wireless electric power transmission is transmitted to the wireless power supplying module to switch the electronic device 10 to the wireless power supplying mode, that is, the detection control unit 143 controls the wireless signal transceiver unit 145 to transmit, to the external wireless electric power transmitting device, the request for starting the wireless electric power transmission, to cause the external wireless electric power transmitting device to transmit the wireless electric power to the wireless electric power receiving module 14, that is, the electronic device 10 is switched back to the wireless power supplying mode (step S402).

Figure 5:
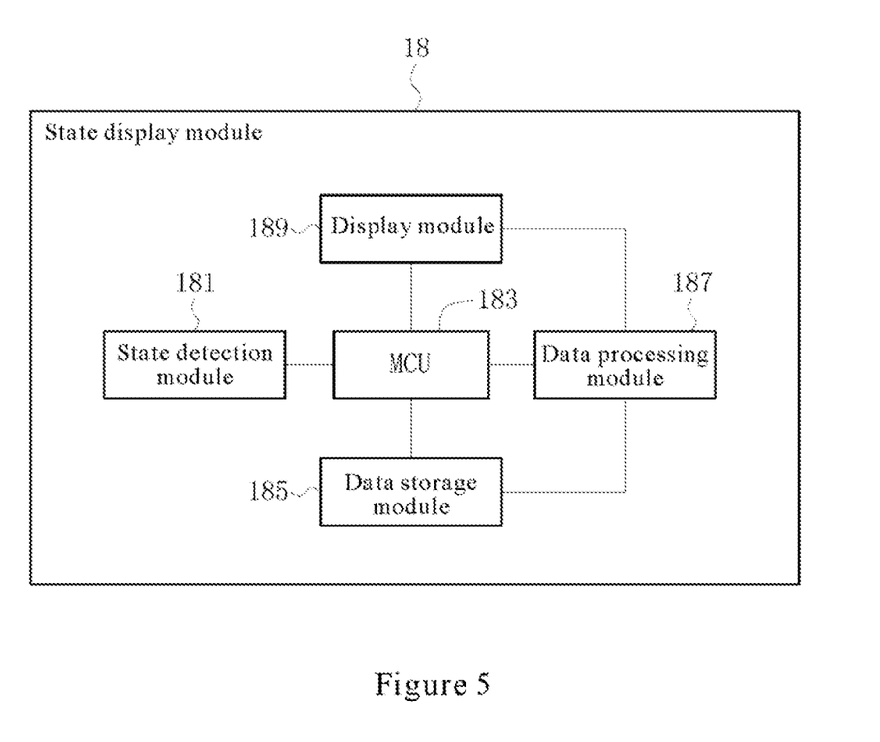
FIG. 5 is a structure block diagram of a state display system of the electronic device according to still another embodiment.

In another embodiment of the present invention, the electronic device 10 can further include a state display system 18. FIG. 5 shows a structure block diagram of the state display system 18 of the electronic device 10 according to another embodiment. The state display system 18 is electrically connected to the switch 16 as well as the internal function circuit of the electronic device 10. When the electronic device 10 is operating in the wired power supplying mode or the wireless power supplying mode, the state display system 18 displays a current power supplying state of the electronic device 10. The state display system 18 includes a state detection module 181, a micro controller unit (MCU) 183, a data storage module 185, a data processing module 187 and a display module 189. The state detection module 181, the data storage module 185, the data processing module 187 and the display module 189 are electrically connected to MCU 183, and the data processing module 187 is electrically connected to the data storage module 185 and the display module 189, respectively. The state detection module 181 is electrically connected to the switch 16, receives a switch state signal (for example, a state where the normally open contact is connected or a state where the normally closed contact is connected) from the switch 16 and transmits the switch state signal to MCU 183 which processes the switch state signal and then outputs a control signal accordingly. The data storage module 185 is connected to MCU 183 and is used to store a preset state information (for example, a wired power supplying state in which the normally open contact is connected, a wireless power supplying state in which the normally closed contact is connected). The data processing module 187 is connected to MCU 183, the data storage module 185 and the display module 189, respectively, receives the control signal output from MCU 183, and reads the matched state information from the data storage module 187. The display module 189 is connected to MCU 183 and the data processing module 187, respectively, and displays the state information transmitted from the data processing module 187.

Briefly, the present invention provides the wireless electric power receiving module (the wireless electric power receiving device) suitable for receiving the wireless electric power in the electronic device, and provides the switch to switch the electronic device between the wireless power supplying mode and the wired power supplying mode, and therefore, the user can flexibly choose the power supplying mode of the electronic device, so that the use convenience is improved greatly. Further, the detection control unit is provided in the wireless electric power receiving module to detect whether the electronic device operates in the wired power supplying mode and inform the external wireless electric power transmitting device of the detection result via the wireless signal transceiver unit, thus when the electronic device operates in the wired power supplying mode, the external wireless electric power transmitting device can be stop from transmitting the wireless electric power for the purpose of protecting the external wireless electric power transmitting device and/or saving the energy consumed. In addition, the state display system is further provided to display the current power supplying state of the electronic device, i.e. the wired power supplying state or the wireless power supplying state, which allows the user to know the power supplying state of the electronic device intuitively and conveniently to improve the convenience and utility.

In addition, those skilled in the art can understand that, in the embodiment of the present invention, the wireless electric power receiving module 14 (or the wireless electric power receiving device 26) may receive the wireless electric power in wireless coupling manners other than the magnetic coupling resonance. Furthermore, the switch 16 in the embodiment of the present invention is not limited to the relay, and can also be a general multiplexer under the control of the detection control unit 143, for example, when the detection control unit 143 detects that the electronic device is provided with the electric power in a wired manner, that is, the electronic device starts to receive the operating voltage (i.e., the power supply voltage) from the wired electronic receiving module (i.e., the wired power supplying module), the detection control unit 143 switches off the wireless electric power receiving module (i.e., the wireless power supplying module) by controlling the multiplexer.

The above description is merely the preferred embodiments of the present invention, and it is not intended to act as any form of limitation for the present invention. Although the present invention has been disclosed with the above preferred embodiment, the embodiment is not intended to limit the present invention. Those skilled in the art can amend and modify the above disclosed technical content as equivalent embodiments with equivalent variation, without departing from the scope of the technical solution of the present invention. However, the contents without departing from the technical solution of the present invention, any of simple amendments, equivalent variations and modifications for the above embodiments based on the technical essence of the present invention, should fall into the scope of the technical solution of the present invention.

INDUSTRIAL APPLICABILITY OF THE INVENTION

The present invention provides the electronic device with the wireless electric power receiving module (the wireless electric power receiving device) suitable for receiving the wireless electric power, and provides the switch adapted to switch the electronic device between the wireless power supplying mode and the wired power supplying mode, and therefore, the user can flexibly choose the power supplying mode of the electronic device, so that the use convenience is improved greatly. Further, the detection control unit is provided in the wireless electric power receiving module to detect whether the electronic device operates in the wired power supplying mode and inform the external wireless electric power transmitting device of the detection result via the wireless signal transceiver unit, thus when the electronic device operates in the wired power supplying mode, the external wireless electric power transmitting device is stopped from transmitting the wireless electric power for the purpose of protecting the external wireless electric power transmitting device and/or saving the energy consumed. In addition, the state display system is further provided for displaying the current power supplying state of the electronic device, which is either the wired power supplying state or the wireless power supplying state, which allows the user to know the power supplying state of the electronic device intuitively and conveniently to improve the convenience and applicability.

The invention claimed is:

1. An electronic device, comprising:
a wired electric power receiving module, which is connected to an external power supply in a wired manner to provide an operating voltage of the electronic device;
a wireless electric power receiving module, which is adapted to receive, in a wireless manner, electric power transmitted from an external wireless electric power transmitting device, and provide the operating voltage of the electric device; and
a switch, which is electrically coupled to the wired electric power receiving module and the wireless electric power receiving module alternatively to switch between the wired electric power receiving module and the wireless electric power receiving module, to provide the operating voltage of the electric device, wherein, the wireless electric power receiving module includes:
a wireless electric power receiving and transforming unit, which is electrically coupled to the switch, and is adapted to receive the wireless electric power, and adjust electrical parameters of the received wireless electric power to output the operating voltage to the switch;
a detection control unit, which is adapted to detect whether the wired connection between the wired electric power receiving module and the external power supply has been established; and
a wireless signal transceiver unit, which is controlled by the detection control unit, the wireless signal transceiver unit being adapted to transmit to the external wireless electric power transmitting device a request for stopping the wireless electric power transmission, when the detection control unit detects that the wired connection between the wired electric power receiving module and the external power supply has been established.

2. The electronic device of claim 1, wherein, when a wired connection between the wired electric power receiving module and the external power supply is established, the operating voltage is provided by the wired electric power receiving module, and when the wired connection between the wired electric power receiving module and the external power supply is not established, the operating voltage is provided by the wireless electric power receiving module.

3. The electronic device of claim 1, wherein, the switch includes a normally open contact and a normally closed contact, the normally closed contact is electrically coupled to the wireless electric power receiving module and the normally open contact is electrically coupled to the wired electric power receiving module.

4. The electronic device of claim 3, wherein, the switch is a relay.

5. The electronic device of claim 1, wherein, the wired electric power receiving module includes:
an AC input terminal, which is electrically coupled to the normally open contact of the switch.

6. The electronic device of claim 1, wherein, a resonant magnetic coupling is established between the wireless electric power receiving module and the external wireless electric power transmitting device to receive the wireless electric power.

7. The electronic device of claim 1, wherein, the electric device further comprises a state display system which is electrically connected to the switch and the internal function circuit of the electronic device, and is adapted to display a current power supplying state of the electronic device when the electronic device is operating in a wired power supplying mode or a wireless power supplying mode.

8. The electronic device of claim 7, wherein, the state display system includes a state detection module, a micro controller unit, a data storage module, a data processing module and a display module, wherein the state detection module, the data storage module, the data processing module and the display module are each electrically connected to the micro controller unit, and the data processing module is electrically connected to the data storage module and the display module, respectively.

9. The electronic device of claim 8, wherein, one end of the state detection module is electrically connected to the switch, and the other end of the state detection module is electrically connected to the micro controller unit; the state detection module receives a switch state signal from the switch, and transmits the switch state signal to the micro controller unit; and the micro controller unit processes the switch state signal and then outputs a control signal to the data processing module.

10. The electronic device of claim 8, wherein, the data storage module is electrically connected to the micro controller unit and is adapted to store preset state information including wired power supplying state information and wireless power supplying state information.

11. The electronic device of claim 10, wherein, the data processing module is electrically connected to the micro controller unit, the data processing module and the display module respectively, and is adapted to receive the control signal output from the micro controller unit, and read matched state information from the data storage module.

12. The electronic device of claim 11, wherein, the display module is connected to the micro controller unit and the data processing module, respectively, and is adapted to display the state information transmitted from the data processing module.

13. A wireless power supplying system including:
a wireless electric power transmitting device, and a wireless electric power receiving device, which is separated from the wireless electric power transmitting device and includes:
a wireless electric power receiving and transforming unit, a voltage being generated by an induction between the wireless electric power receiving and transforming unit and the wireless electric power transmitting device;

a detection control unit, which is adapted to detect whether the electric device operates in a wired power supplying mode; and a wireless signal transceiver unit, which is controlled by the detection control unit, and is adapted to transmit to the wireless electric power transmitting device a request for stopping wireless electric power transmission, when the detection control unit detects that the electronic device operates in the wired power supplying mode.

14. The wireless power supplying system of claim 13, wherein, a resonant magnetic coupling is established between the wireless electric power receiving and transforming unit and the wireless electric power transmitting device to receive a high frequency AC signal.

15. The wireless power supplying system of claim 13, wherein, the wireless electric power transmitting device includes:

a main controller;

a wireless electric power generating and transmitting unit, which is controlled by the main controller to generates a high frequency AC signal according to a DC voltage, and transmits the high frequency AC signal to the wireless electric power receiving and transforming unit in a wireless manner; and a second wireless signal transceiver unit, which is electrically connected to the main controller, receives the request for stopping the wireless electric power transmission, and transmits the request to the main controller.

16. The wireless power supplying system of claim 15, further comprising: a power supplying device, which is adapted to provide the DC voltage and the operating voltages of the main controller and the wireless electric power transmitting unit according to an AC input voltage.

17. A power supplying method of an electronic device, suitable for the electronic device having a wireless power supplying module and a wired power supplying module that are switchable, the method including steps of:

presetting the electronic device to receive a power supply voltage from the wireless power supplying module;

switching off the wireless power supplying module when the electronic device starts to receive the power supply voltage from the wired power supplying module;

detecting, by a detection control unit, whether a wired connection between a wired electric power receiving module and an external power supply has been established;

transmitting a request for starting wireless electric power transmission to an external wireless power supplying module and switching the electronic device to a wireless power supplying mode if the wired connection between the wired electric power receiving module and the external power supply has not been established; and transmitting, by a wireless signal transceiver unit that is controlled by the detection control unit, to the external wireless power supplying module a request for stopping the wireless electric power transmission, when the detection control unit detects that the wired connection between the wired electric power receiving module and the external power supply has been established.

18. The power supplying method of the electronic device of claim 17, wherein, before the step of switching off the wireless power supplying module when the electronic device starts to receive the power supply voltage from the wired power supplying module, the method further comprising step of:

detecting whether the electronic device has started to receive the power supply voltage from the wired power supplying module.

19. The power supplying method of the electronic device of claim 18, wherein, after the step of detecting whether the electronic device has started to receive the power supply voltage from the wired power supplying module, the method further comprising step of:

after detecting that the electronic device has started to receive the power supply voltage from the wired power supplying module, transmitting a result of the detection outwards from the electronic device in a wireless manner.

* * * * *